United States Patent
Tanguy

(10) Patent No.: US 8,783,606 B2
(45) Date of Patent: Jul. 22, 2014

(54) METHOD FOR IMPROVING THE AERODYNAMIC EFFICIENCY OF THE VERTICAL TAIL OF AN AIRCRAFT

(75) Inventor: Alain Tanguy, Toulouse (FR)

(73) Assignee: Airbus Operations (SAS), Toulouse Cedex (FR)

(*) Notice: Subject to any disclaimer, the term of this patent is extended or adjusted under 35 U.S.C. 154(b) by 213 days.

(21) Appl. No.: 13/439,341

(22) Filed: Apr. 4, 2012

(65) Prior Publication Data

US 2012/0256047 A1 Oct. 11, 2012

(30) Foreign Application Priority Data

Apr. 6, 2011 (FR) ...................................... 11 52980

(51) Int. Cl.
*B64C 9/00* (2006.01)
*B64C 5/06* (2006.01)
*B64C 3/14* (2006.01)

(52) U.S. Cl.
CPC .. *B64C 5/06* (2013.01); *Y02T 50/12* (2013.01); *B64C 2003/147* (2013.01); *B64C 9/00* (2013.01)
USPC ........................................... 244/87; 244/130

(58) Field of Classification Search
CPC ........ B64C 9/00; B64C 9/02; B64C 2009/00; B64C 1/0009; B64C 1/38; B64C 5/06
USPC ..................... 244/1 R, 87, 88, 91, 130, 129.1
See application file for complete search history.

(56) References Cited

U.S. PATENT DOCUMENTS

| | | | | |
|---|---|---|---|---|
| 2,070,809 | A * | 2/1937 | Root ................................ | 244/87 |
| 5,375,794 | A * | 12/1994 | Bleeg .......................... | 244/76 C |
| 5,692,704 | A * | 12/1997 | Buttgereit et al. ............. | 244/119 |
| 6,021,977 | A * | 2/2000 | Khavari .......................... | 244/87 |
| 7,562,845 | B2 * | 7/2009 | Schoene ....................... | 244/119 |
| 7,896,289 | B2 * | 3/2011 | Verde Preckler et al. ........ | 244/91 |
| 7,913,949 | B2 * | 3/2011 | Hoffenberg ..................... | 244/87 |
| 8,038,093 | B2 * | 10/2011 | Llamas Sandin et al. ...... | 244/87 |
| 8,152,097 | B2 * | 4/2012 | Verde Preckler et al. ........ | 244/87 |
| 8,342,446 | B2 * | 1/2013 | Chareyre et al. ................ | 244/87 |
| 2009/0026311 | A1 * | 1/2009 | Verde Preckler et al. ........ | 244/91 |
| 2009/0159755 | A1 * | 6/2009 | Gonzalez Gozalbo et al. ............................. | 244/215 |
| 2009/0256025 | A1 * | 10/2009 | Verde Preckler et al. ........ | 244/87 |
| 2010/0032519 | A1 * | 2/2010 | Chareyre et al. ................ | 244/87 |
| 2010/0155528 | A1 | 6/2010 | Gonzalez et al. | |

(Continued)

FOREIGN PATENT DOCUMENTS

WO 2010133789 11/2010

OTHER PUBLICATIONS

French Patent Office, Preliminary Search Report for FR 1152980, Nov. 29, 2011 (2 pgs.).

*Primary Examiner* — Benjamin P Lee
(74) *Attorney, Agent, or Firm* — Wood, Herron & Evans, LLP

(57) ABSTRACT

A method for improving the aerodynamic efficiency of the vertical tail of an aircraft includes varying the thickness of the trailing edge of the rudder as a function of the span of the vertical tail. This variation is intended to adapt the local value of the coefficient of lateral lift applied to the vertical tail closer to a maximum allowable value. The maximum allowable value is specifically the value at which a separation of the aerodynamic flow is observed on the surface of the vertical tail.

8 Claims, 3 Drawing Sheets

(56) References Cited

U.S. PATENT DOCUMENTS

| | | |
|---|---|---|
| 2012/0048995 A1 | 3/2012 | Tanguy |
| 2012/0091266 A1 * | 4/2012 | Whalen et al. .................. 244/87 |
| 2012/0104184 A1 * | 5/2012 | Weber et al. ................. 244/76 C |
| 2012/0256047 A1 * | 10/2012 | Tanguy .......................... 244/87 |
| 2013/0320137 A1 * | 12/2013 | Maenz ............................ 244/87 |

\* cited by examiner

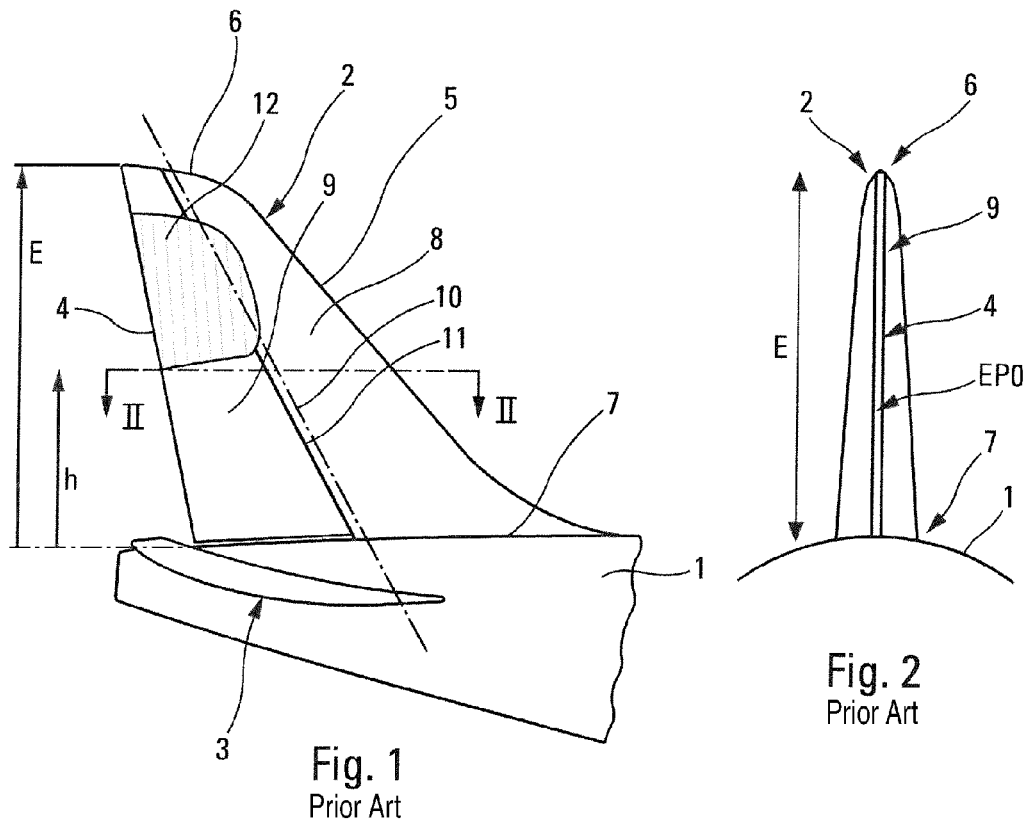
Fig. 1
Prior Art
Fig. 2
Prior Art
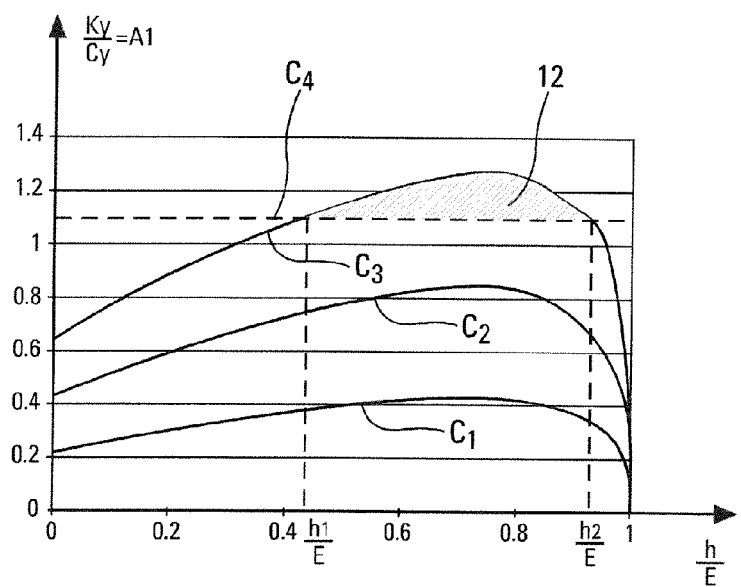
Fig. 3
Prior Art

METHOD FOR IMPROVING THE AERODYNAMIC EFFICIENCY OF THE VERTICAL TAIL OF AN AIRCRAFT

TECHNICAL FIELD

The present invention relates to a method for improving the aerodynamic efficiency of the vertical tail of an aircraft, in particular, a transport airplane, and a vertical tail with an improved efficiency, as well as an aircraft comprising such a vertical tail.

The present invention relates to a method for improving the aerodynamic efficiency of the vertical tail of an aircraft, in particular, a transport airplane, and a vertical tail with an improved efficiency, as well as an aircraft comprising such a vertical tail.

The present invention is adapted for any type of aircraft provided with a vertical tail and, in particular, for airplanes having their engines carried by the wings.

BACKGROUND

It is known that the vertical tail of an aircraft is able to generate, as a result of its surface, a lateral lift and an aerodynamic drag, and that the vertical tail should ensure to said aircraft the stability, the maneuverability and the balance for all flight conditions.

The surface of the vertical tail is dimensioned so as to be able to compensate for the yaw effect created as a result of one of the engines of the aircraft becoming defective, allowing to ensure to the aircraft a sufficiently low minimum control speed in the case of an engine failure so as to meet the take-off and landing performances of the aircraft. The dimensions of this vertical tail are calculated at a low skid state of the aircraft, for a rudder having, with respect to the drift of the vertical tail, a maximum angular position.

SUMMARY OF THE INVENTION

This invention aims at increasing the lateral lift of the vertical tail or at maintaining the same lateral lift while decreasing the surface of the vertical tail. To this end, it provides a method allowing to improve the local aerodynamic efficiency of the vertical tail on the whole height of the vertical tail, that is to bring the local value of the coefficient of lateral lift closer to a maximum allowable value of the coefficient of lateral lift beyond which the air layer is separated from the surface of the vertical tail.

To this end, according to this invention, the method for improving the aerodynamic efficiency of the vertical tail of an aircraft comprising a rudder able to pivot with respect to said drift, is remarkable in that the thickness of the trailing edge of the rudder is varied as a function of the span of the vertical tail, so as to bring the local value of the coefficient of lateral lift applied to the vertical tail closer to a maximum allowable value.

Advantageously, the maximum allowable value of the coefficient of lateral lift is the value beyond which, for a given angle between the rudder and the drift, a separation of the aerodynamic flow is observed on the surface of the vertical tail.

Moreover, the variable thickness is determined, from the trailing edge of the rudder, as a function of the local value of the coefficient of lateral lift, calculated with an angle of the rudder, with respect to the drift, for which a separation is observed of the aerodynamic flow on the surface of the vertical tail.

Thanks to this invention, and as set forth below, the intrinsic efficiency of the profile is increased, increasing the thickness of the trailing edge of the rudder on the internal part of the vertical tail and decreasing the thickness of the trailing edge on the external part, so as to obtain the desired load law.

In a first simplified embodiment of the method according to this invention, the thickness of the trailing edge of the rudder is varied as a function of the span of the vertical tail, according to a thickness variation linear law, with a thickness decreasing from the internal end to the external end of the vertical tail.

In addition, in a second optimized and preferred embodiment of the method according to this invention, the thickness of the trailing edge of the rudder is varied as a function of the span of the vertical tail, with a thickness decreasing from the internal end to the external end of the vertical tail, according to an optimized thickness variation law, allowing to have said local value of the coefficient of lateral lift (substantially) corresponding to said maximum allowable value.

The present invention also relates to a vertical tail of an aircraft comprising a drift and a rudder able to pivot said drift.

According to this invention, said vertical tail is remarkable in that said rudder has a variable thickness from the trailing edge following the span of the vertical tail, enabling to bring the local value of the coefficient of lateral lift applied to the vertical tail closer to a maximum allowable value.

In a first simplified embodiment, the thickness of the trailing edge of the rudder varies as a function of the span of the vertical tail, according to a thickness variation linear law, with a thickness decreasing from the internal end to the external end of the vertical tail.

In addition, in a second optimized and preferred embodiment, the thickness of the trailing edge of the rudder varies as a function of the span of the vertical tail, with a thickness decreasing from the internal end to the external end of the vertical tail, according to an optimized thickness variation law, allowing to have said local value of the coefficient of lateral lift (substantially) corresponding to said maximum allowable value.

The present invention further relates to an aircraft, in particular a transport airplane, being provided with a vertical tail such as mentioned hereinabove.

BRIEF DESCRIPTION OF DRAWINGS

The FIGS. of the accompanying drawings will better explain how this invention could be implemented. In these FIGS. like reference numerals relate to like components.

FIG. 1 schematically shows the tail of the fuselage of an aircraft with a vertical tail according to the state of the art.

FIG. 2 is a rear view of the usual vertical tail of FIG. 1.

FIG. 3 shows a diagram plotting the evolution of the ratio A1 between the local value of the coefficient of lateral lift Ky and the constant value of the coefficient of lateral lift Cy calculated for a minimum control speed, as a function of the height, relatively to the span, of the vertical tail of FIG. 1.

DETAILED DESCRIPTION

Figure 4:
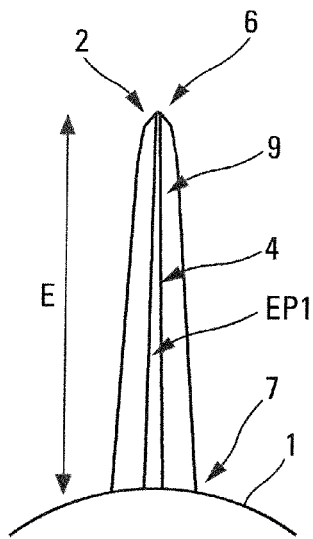
FIG. 4 shows a first embodiment of the vertical tail according to this invention.

The tail 1 of the aircraft fuselage, shown on FIG. 1, carries a substantially trapezoid shaped vertical tail 2 and a horizontal tail 3.

The tail 1 of the aircraft fuselage, shown on FIG. 1, carries a substantially trapezoid shaped vertical tail 2 and a horizontal tail 3.

The vertical tail 2 is delimited by a trailing edge 4, a leading edge 5, an upper end or tip 6 (being external with respect to the fuselage) and a lower end or point of attachment 7 (being internal with respect to the fuselage). The vertical tail 2 comprises a drift 8 and a rudder 9 being hinged on the drift 8 by a hinge axis 10 slightly ahead of the rear end edges 11 of the drift 8 and being provided with the trailing edge 4. The span of the vertical tail 2 (or of the rudder 9) between the tip 6 and the point of attachment 7 is referred to as E.

In the state of the art as described on FIGS. 1 to 3, the thickness EP0 of the trailing edge 4 of the rudder 9 (that is the width horizontally of this trailing edge 4, seen from the rear) is constant whatever the height h, as shown, more specifically, on FIG. 2.

On the diagram of FIG. 3, there are shown three bell shaped curves C1, C2 and C3 each corresponding to the evolution of the above defined ratio A1 as a function of the height h relatively to the span E, for three different angles of the rudder 9 with respect to the drift 8. A horizontal straight line C4 corresponds to the maximum ratio A1 beyond which a separation 12 of the air flow on the vertical tail 2 is observed.

As can be seen, for each curve C1, C2 and C3, the ratio A1 increases up to a limit height, and afterwards decreases until becoming nil at the span E. The limit height is located closer to the tip 6 than to the point of attachment 7, as the air flow is submitted to more aerodynamic disturbances on this part of the vertical tail 2.

The angle of the rudder 9 with respect to the drift 8 is 10°, 20°, 45°, respectively for the curves C1, C2 and C3. The ratio A1 of the three curves C1, C2 and C3 is proportional to the angle of the rudder 9. Thus, whatever the height h relatively to the span E, the curve C3 is above the curve C2 being itself above the curve C1.

The position of the two curves C1 and V2 under the straight line C4 for any height h included within the interval [0, E], illustrates that, for the angles 10° and 20°, the local lateral lift of the vertical tail 2 is lower than the maximum allowable lateral lift without separation of the air layer, whatever the height h.

The curve C3 is under the straight line C4 for a height h included within the ranges [0, h1] and [h2, E], and is above the straight line C4 for a height h included within the range [h1, h2].

Otherwise stated, for the angle of 45°, the local lateral lift of the vertical tail 2 is:
 lower than the maximum lateral lift for a height h included within the ranges [0, h1] and [h2, E]; and
 higher than the maximum lateral lift for a height h included within the range [h1, h2].

The deviations between the local lateral lift of the vertical tail 2 and the maximum lateral lift indicate that the constant thickness EP0 (FIGS. 5 and 8) of the trailing edge 4 of the rudder 9, in the state of the art, whatever the height h, is not adapted. In addition, as shown on FIGS. 5 and 8, as a result of the decreasing evolution of the span drift chord, the relative thickness Eprel0 of the trailing edge 4 increases in the direction of the external end 6, the relative thickness of the trailing edge corresponding to the ratio between the thickness of the trailing edge and the span drift chord.

The invention consists in varying the thickness EP to bring the ratio A1 of the curves C1, C2 and C3, from now on referred to as C'1, C'2 and C'3, closer to the maximum ratio A1 of the straight line C4.

Figure 6:
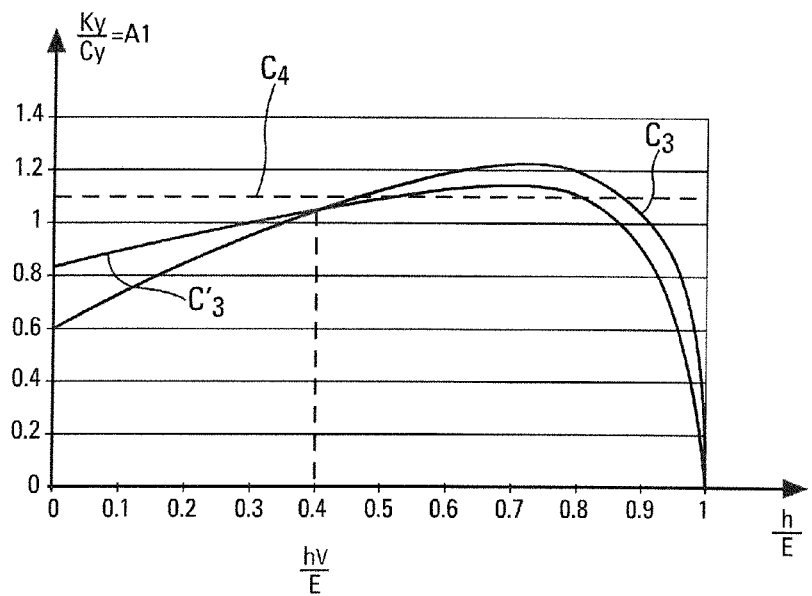
FIG. 6 shows a diagram plotting the evolution of the ratio A1, as a function of the height relatively to the span of the vertical tail of FIG. 4.
Figure 9:
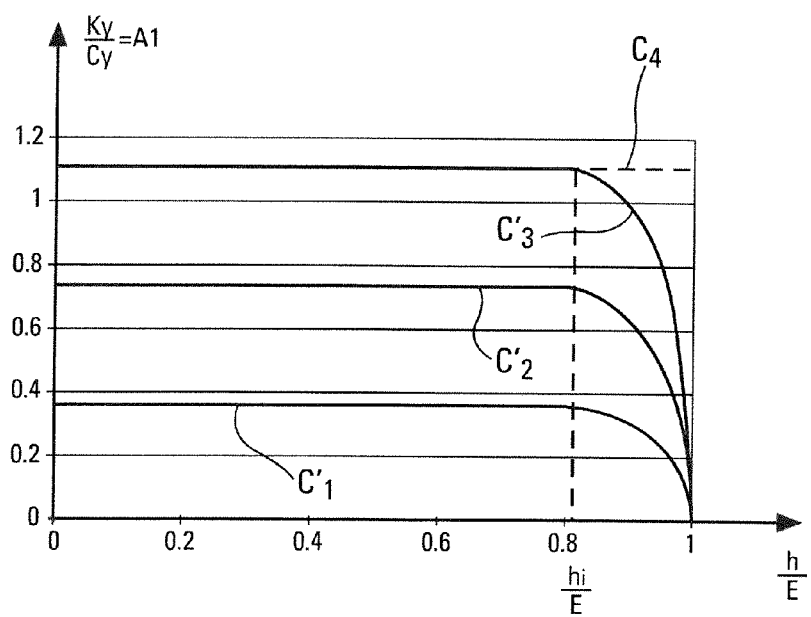
FIG. 9 shows a diagram plotting the evolution of the ratio A1, as a function of the height relatively to the span, of the vertical tail of FIG. 7.

The variable thickness EP is determined as a function of the ratio A1 calculated for an angle of the rudder 9, with respect to the drift 8, generating a separation 12, corresponding to the curve C'3 of FIGS. 6 and 9. For instance, this angle is 45°.

Thanks to this invention, and as set forth below, the intrinsic efficiency of the profile is increased, increasing the thickness of the trailing edge 4 of the rudder 9 on the internal part 7 of the vertical tail 2 and decreasing it on its external part 6, so as to obtain the desired load law.

Figure 5:
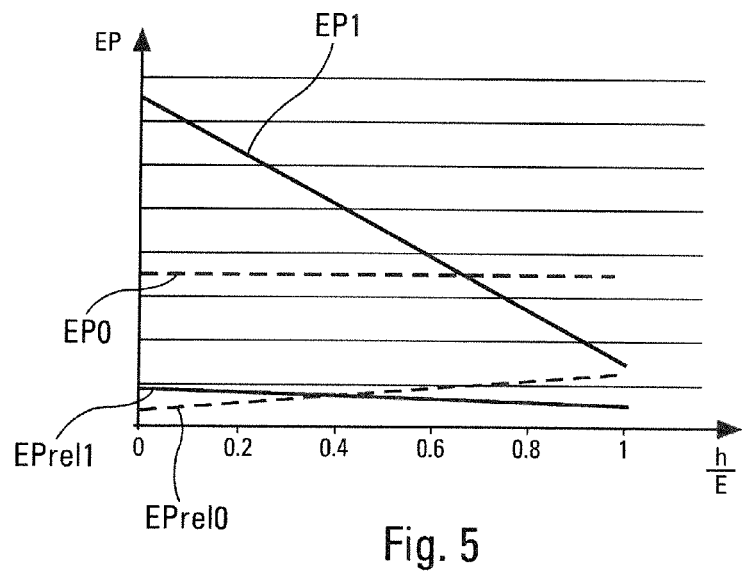
FIG. 5 shows a diagram plotting the evolution of the thickness of the trailing edge, as a function of the height relatively to the span of the vertical tail of FIG. 4.

A first embodiment of the vertical tail 2 according to the invention, and more specifically the diagram plotting the evolution of the ratio A1 of the curve C'3 as a function of the height h, relatively to the span E, are respectively shown on FIGS. 4 to 6.

In this first embodiment, the thickness EP of the trailing edge 4 of the rudder 9 varies, as a function of the height h relatively to the span E of the vertical tail 2, according to a thickness variation linear law EP1, with a thickness decreasing from the internal end 7 (h=0) to the external end 6 (h=E) of the vertical tail 2. The trailing edge 4 having to be manufactured easily, its minimum thickness is restricted. Moreover, in this case, the relative thickness Eprel1 of the trailing edge 4 slightly decreases, in a linear way, in the direction of the external end 6.

Thus, the absolute value of the difference C'3(h)−A1maximum is lower than the absolute value of the difference C3(h)−A1maximum integrated on the height h describing the range [0, E] for the height h of the vertical tail 2. The local value of the coefficient of lateral lift Ky of the curve C'3 is thus brought (on average) closer to the value of the maximum coefficient of lateral lift Ky of the straight line C4, and, more specifically, for most part of the height h (in particular when being in the vicinity of maximum deflection values), the value of the coefficient of lateral lift Cy being a constant.

Figure 7:
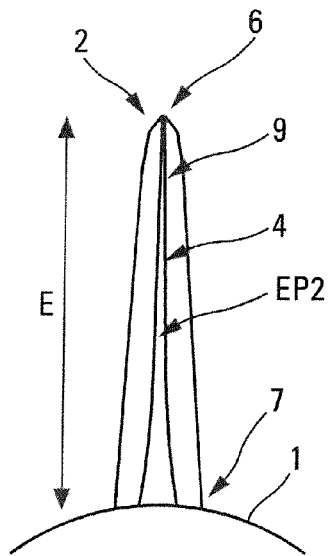
FIG. 7 shows a second embodiment of the vertical tail according to this invention.
Figure 8:
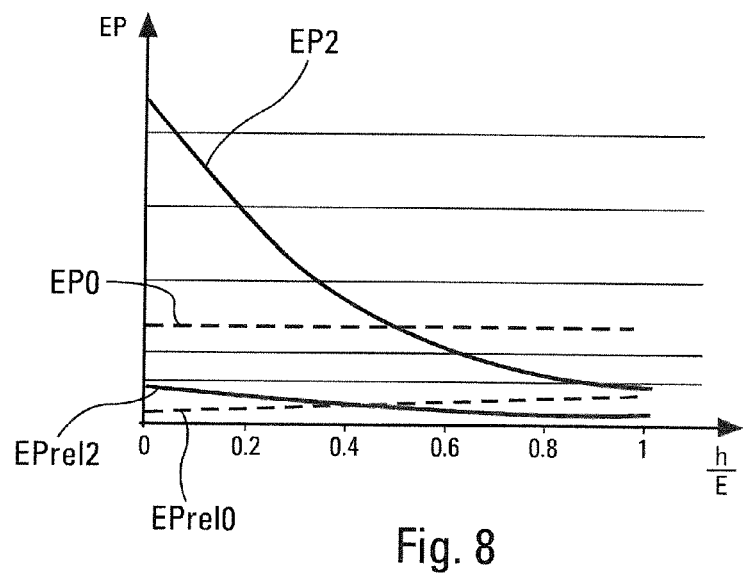
FIG. 8 shows a diagram plotting the evolution of the thickness of the trailing edge, as a function of the height relatively to the span, of the vertical tail of FIG. 7.

A second embodiment of the vertical tail 2 according to the invention, and more specifically the diagram plotting the evolution of the ratio A1 of the curve C'3 as a function of the height h, relatively to the span E, are respectively shown on FIGS. 7 to 9.

In this second embodiment, the thickness EP of the trailing edge 4 of the rudder 9 varies, as a function of the height h relatively to the span E of the vertical tail 2, with a thickness decreasing from the internal end 7 (h=0) to the external end 6 (h=E) of the vertical tail 2, according to an optimized thickness variation law EP2, enabling to have said local value of the coefficient of lateral lift (substantially) corresponding to said maximum allowable value. In this case, the relative thickness Eprel2 of the trailing edge 4 slightly decreases in the direction of the external end 6.

The values A1 of the curves C'1 and C'2, calculated for angles of 10° and 20°, are two constants being lower than the maximum ratio A1 for a height h included within the range [0, hi], and decrease for a height h included within the range [hi, E].

For each one of the three curves C'1, C'2 and C'3, the absolute value of the difference C'3(h)−A1maximum integrated on the height h describing the range [0, E], is lower than the absolute value of the difference C3(h)−A1maximum integrated on the height h describing the range [0, E]. The local value of the coefficient of lateral lift Ky of the curves C'1, C'2 and C'3 is thus brought on average closer to the value of the coefficient of lateral drift Ky maximum of the straight line C4, the value of the coefficient of lateral drift Cy being a constant.

The second embodiment is advantageous, compared to the first embodiment, in that it optimizes the bringing together between the local value of the coefficient of lateral lift and the maximum allowable value.

Thus, the two previous embodiments enable to bring the local value of the coefficient of lateral lift closer to the maximum allowable value of the coefficient of lateral lift. They allow to decrease the size of the vertical tail and thereby to improve the drag. Moreover, advantageously, they allow to make the bending efforts due to the angular positions of the rudder 9 with respect to the drift 8, weaker than those resulting from the configuration of the state of the art vertical tail, because the lateral lift applied to the vertical tail is distributed to a higher extent to the point of attachment 7 than to the tip 6. As a result, high bulk gains are achieved for producing the vertical tail 2 of the aircraft.

The invention claimed is:

1. A method for improving the aerodynamic efficiency of an aircraft vertical tail, comprising a drift and a rudder able to pivot with respect to the drift, the method comprising:
   varying a thickness of a trailing edge of the rudder as a function of a span of the vertical tail, to bring a local value of a coefficient of lateral lift applied to the vertical tail closer to a maximum allowable value, wherein the maximum allowable value of the coefficient of lateral lift is the value beyond which, for a given angle between the rudder and the drift, a separation of the aerodynamic flow is observed on the surface of the vertical tail.

2. The method according to claim 1, wherein the variable thickness of the trailing edge of the rudder is determined, as a function of the local value of the coefficient of lateral lift calculated with an angle of the rudder with respect to the drift, for which a separation of the aerodynamic flow is observed on the surface of the vertical tail.

3. The method according to claim 1, wherein the thickness of the trailing edge of the rudder is varied as a function of the span of the vertical tail, according to a thickness variation linear law (EP1), with a thickness decreasing from an internal end to an external end of the vertical tail.

4. The method according to claim 1, wherein the thickness of the trailing edge of the rudder is varied as a function of the span of the vertical tail, with a thickness decreasing from an internal end to an external end of the vertical tail, according to an optimized thickness variation law (EP2) enabling to match the local value of the coefficient of lateral lift and the maximum allowable value.

5. An aircraft vertical tail, comprising:
   a drift and a rudder able to pivot with respect to said drift,
   wherein said rudder has a variable thickness from a trailing edge thereof following a span of the vertical tail, enabling to bring a local value of a coefficient of lateral lift applied to the vertical tail closer to a maximum allowable value, and
   wherein the maximum allowable value of the coefficient of lateral lift is the value beyond which, for a given angle between the rudder and the drift, a separation of the aerodynamic flow is observed on the surface of the vertical tail.

6. The vertical tail according to claim 5, wherein the thickness of the trailing edge of the rudder is varied as a function of the span of the vertical tail, according to a thickness variation linear law (EP1), with a thickness decreasing from an internal end to an external end of the vertical tail.

7. The vertical tail according to claim 5, wherein the thickness of the trailing edge of the rudder is varied as a function of the span of the vertical tail, with a thickness decreasing from an internal end to an external end of the vertical tail, according to an optimized thickness variation law (EP2), enabling to match said local value of the coefficient of lateral lift and said maximum allowable value.

8. An aircraft, comprising:
   a fuselage; and
   a vertical tail such as specified in claim 5.

\* \* \* \* \*